United States Patent
Koshimizu et al.

(10) Patent No.: US 10,033,652 B2
(45) Date of Patent: Jul. 24, 2018

(54) MOBILE COMMUNICATION METHOD, POLICY AND CHARGING RULE SERVER APPARATUS, AND MOBILE MANAGEMENT NODE

(71) Applicant: NTT DOCOMO, INC., Tokyo (JP)

(72) Inventors: Takashi Koshimizu, Tokyo (JP); Tomoki Shibahara, Tokyo (JP); Ryohei Ohgushi, Tokyo (JP); Takashi Morita, Tokyo (JP); Shin-ichi Isobe, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/353,972

(22) PCT Filed: Nov. 7, 2012

(86) PCT No.: PCT/JP2012/078805
§ 371 (c)(1),
(2) Date: Apr. 24, 2014

(87) PCT Pub. No.: WO2013/069669
PCT Pub. Date: May 16, 2013

(65) Prior Publication Data
US 2014/0301204 A1 Oct. 9, 2014

(30) Foreign Application Priority Data
Nov. 10, 2011 (JP) .................. 2011-246553

(51) Int. Cl.
*H04L 12/825* (2013.01)
*H04L 12/14* (2006.01)
(Continued)

(52) U.S. Cl.
CPC .......... *H04L 47/25* (2013.01); *H04L 12/1407* (2013.01); *H04L 12/1489* (2013.01);
(Continued)

(58) Field of Classification Search
CPC .......... H04W 28/0247; H04W 28/0289; H04L 12/1489; H04L 47/20
See application file for complete search history.

(56) References Cited

U.S. PATENT DOCUMENTS

2006/0209686 A1\* 9/2006 Wigard ................. H04L 1/1887
370/229
2009/0046655 A1 2/2009 Zhao et al.
(Continued)

FOREIGN PATENT DOCUMENTS

EP 1670273 A1 6/2006
EP 2375818 A1 10/2011
(Continued)

OTHER PUBLICATIONS

Office Action issued in corresponding Japanese Application No. 2011-246553, dated Jun. 2, 2015 (6 pages).
(Continued)

*Primary Examiner* — Yemane Mesfin
*Assistant Examiner* — Henry Baron
(74) *Attorney, Agent, or Firm* — Osha Liang LLP

(57) ABSTRACT

When congestion is detected in an S-GW, communications are allowed to continue as many as possible. A mobile communication method according to the present invention includes: notifying, by the S-GW, a PDF in a PCRF of detection of congestion when the congest is detected; acquiring, by the PDF in the PCRF, charging system information regarding UEs using an S1 bearer and an S5 bearer set in the S-GW from an HSS; acquiring, by the PDF in the PCRF, communication service class information in a flow unit in the S1 bearer and the S5 bearer from the P-GW according to the notification; and performing, by the PDF in the PCRF, bandwidth adjustment on specific flows of the S1 bearer and the S5 bearer based on the charging system information and
(Continued)

the communication service class information in the flow unit.

1 Claim, 9 Drawing Sheets

(51) Int. Cl.
*H04W 28/02* (2009.01)
*H04L 12/813* (2013.01)
*H04M 15/00* (2006.01)
*H04W 36/38* (2009.01)
*H04W 36/22* (2009.01)
*H04L 12/801* (2013.01)

(52) U.S. Cl.
CPC ............ *H04L 47/20* (2013.01); *H04M 15/66* (2013.01); *H04W 28/0247* (2013.01); *H04W 28/0289* (2013.01); *H04W 36/385* (2013.01); *H04L 47/14* (2013.01); *H04W 36/22* (2013.01)

(56) References Cited

U.S. PATENT DOCUMENTS

| | | | |
|---|---|---|---|
| 2010/0329118 A1* | 12/2010 | Adams | H04L 47/10 370/235 |
| 2011/0173332 A1* | 7/2011 | Li | H04L 12/14 709/227 |
| 2011/0261695 A1* | 10/2011 | Zhao | H04W 28/10 370/232 |
| 2012/0218899 A1 | 8/2012 | Ozawa | |
| 2012/0254427 A1* | 10/2012 | Adams | H04L 12/2823 709/225 |
| 2013/0176848 A1* | 7/2013 | Jinzaki | H04L 47/193 370/230.1 |
| 2014/0011512 A1* | 1/2014 | Hu | H04L 12/1407 455/452.2 |
| 2015/0156666 A1* | 6/2015 | Won | H04W 28/0289 370/229 |

FOREIGN PATENT DOCUMENTS

| | | |
|---|---|---|
| JP | 2003-70054 A | 3/2003 |
| JP | 2006-174039 A | 6/2006 |
| JP | 2008-523670 A | 7/2008 |
| WO | 2006/061184 A1 | 6/2006 |
| WO | 2009090582 A1 | 7/2009 |
| WO | 2010149084 A1 | 12/2010 |
| WO | 2011006889 A1 | 1/2011 |
| WO | 2011020208 A1 | 2/2011 |
| WO | 2011/055721 A1 | 5/2011 |

OTHER PUBLICATIONS

International Search Report for corresponding International Application No. PCT/JP2012/078805, dated Jan. 8, 2013 (2 pages).
Written Opinion for corresponding International Application No. PCT/JP2012/078805, dated Jan. 8, 2013 (3 pages).
3GPP TS 23.401 V10.5.0; "3rd Generation Partnership Project; Technical Specification Group Services and System Aspects; General Packet Radio Service (GPRS) enhancements for Evolved Universal Terrestrial Radio Access Network (E-UTRAN) access (Release 10);" Sep. 2011 (282 pages).
3GPP TS 23.203 V11.3.0; "3rd Generation Partnership Project; Technical Specification Group Services and System Aspects; Policy and Charging Control architecture (Release 11);" Sep. 2011 (167 pages).
3GPP TS 36.300 V10.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10);" Sep. 2011 (194 pages).
Extended European Search Report issued in the counterpart European Patent Application No. 12847531.6, dated Nov. 19, 2015 (16 pages).
Office Action issued in the counterpart European Patent Application No. 12847531.6, dated Jul. 6, 2015 (7 pages).

\* cited by examiner

MOBILE COMMUNICATION METHOD, POLICY AND CHARGING RULE SERVER APPARATUS, AND MOBILE MANAGEMENT NODE

TECHNICAL FIELD

The present invention relates to a mobile communication method, a policy and charging rule server apparatus, and a mobile management node.

BACKGROUND ART

In mobile communication systems defined by 3GPP in the related art, when serving gateway apparatuses (S-GWs) detect congestion, an instruction to perform access barring is configured to be given to eNBs (radio base stations).

Specifically, the eNBs receiving this instruction are configured to notify UEs (mobile stations) of a barring time and the UEs are configured not to perform call request processes until the barring time expires.

CITATION LIST

Non-Patent Documents

Non-Patent Document 1: 3GPP TS23.401
Non-Patent Document 2: 3GPP TS23.203
Non-Patent Document 3: 3GPP TS36.300

SUMMARY OF INVENTION

In the mobile communication systems defined by the 3GPP in the related art, however, as described above, when the S-GWs detect the congestion, call requests of the mobile stations are barred. Therefore, this barring is not a preferable countermeasure in viewpoint of communication service providers that desire to promote more communications.

Also, in the mobile communication systems defined by the 3GPP in the related art, a system is provided which confirms a congestion status of a Universal Terrestrial Radio Access Network (UTRAN)/GSM EDGE Radio Access Network (GERAN) type radio access network in advance at the time of detection of congestion in an Evolved-Universal Terrestrial Radio Access Network (E-UTRAN) type radio access network and performs handover to the UTRAN/GERAN type radio access network.

Accordingly, when congestion is detected in an E-UTRAN type radio access network, an event in which handover to a UTRAN/GERAN type radio access network is performed and connection to a call disconnection is made occurs in spite of the fact that the UTRAN/GERAN type radio access network is also congested.

A system which performs handover to a UTRAN/GERAN type radio access network or the like when congestion occurs in an E-UTRAN type S-GW is provided either.

Accordingly, the present invention has been made in view of the above-described problems and an object of the present invention is to provide a mobile communication method, a policy and charging rule server apparatus, and a mobile management node capable of allowing communications to continue as many as possible when congestion is detected in an S-GW.

According to a first characteristic of the present invention, there is provided a mobile communication method including: notifying, by a serving gateway apparatus, a policy and charging rule server apparatus of detection of congestion when the congestion is detected; acquiring, by the policy and charging rule server apparatus, charging system information regarding a mobile station using a bearer set in the serving gateway apparatus from a subscriber information management server apparatus according to the notification; acquiring, by the policy and charging rule server apparatus, communication service class information in a flow unit inside the bearer from a packet data network gateway apparatus according to the notification; and performing, by the policy and charging rule server apparatus, bandwidth adjustment in a specific flow inside the bearer based on the charging system information and the communication service class information.

According to a second characteristic of the present invention, there is provided a policy and charging rule server apparatus including: a reception unit configured to receive notification indicating detection of congestion from a serving gateway apparatus; and a control unit configured to perform bandwidth adjustment in a specific flow inside a bearer according to the notification based on charging system information which is acquired from a subscriber information management server apparatus and is information regarding a mobile station using the bearer set in the serving gateway apparatus, and communication service class information in a flow unit inside the bearer which is acquired from a packet data network gateway apparatus.

According to a third characteristic of the present invention, there is provided a mobile communication method including: notifying, by a serving gateway apparatus connected to first radio access network and second radio access network, a policy and charging rule server apparatus of detection of congestion, when the congestion is detected on a side of the first radio access network; acquiring, by the policy and charging rule server apparatus, charging system information regarding a mobile station using a bearer set in the serving gateway apparatus from a subscriber information management server apparatus and acquiring communication service class information in a flow unit inside the bearer from a packet data network gateway apparatus, when the notification is received and the congestion does not occur on a side of the second radio access network; and instructing, by the policy and charging rule server apparatus, the serving gateway apparatus to perform handover of a specific flow inside the bearer or the mobile station to the second radio access network based on the charging system information and the communication service class information.

According to a fourth characteristic of the present invention, there is provided a policy and charging rule server apparatus including: a reception unit configured to receive, from a serving gateway apparatus connected to first radio access network and second radio access network, notification indicating detection of congestion on a side of the first radio access network; and a control unit configured to instruct the serving gateway apparatus to perform handover of a specific flow or a mobile station to the second radio access network based on charging system information, which is acquired from a subscriber information management server apparatus and is information regarding the mobile station using a bearer set in a radio base station, and communication service class information in a flow unit inside the bearer which is acquired from a packet data network gateway apparatus, when the notification is received and the congestion does not occur on a side of the second radio access network.

According to a fifth characteristic of the present invention, there is provided a mobile communication method in a mobile communication system including first radio access network and second radio access network. The mobile communication method includes: notifying, by a radio base station in the first radio access network, a mobile management node of detection of congestion when the congestion is detected; acquiring, by the mobile management node, charging system information regarding a mobile station using a bearer set in the radio base station and communication service class information in a flow unit inside the bearer from a policy and charging rule server apparatus when the notification is received and congestion does not occur on a side of the second radio access network; and instructing, by the mobile management node, a serving gateway apparatus to perform handover of a specific flow inside the bearer or the mobile station to the second radio access network based on the charging system information and the communication service class information.

According to a sixth characteristic of the present invention, there is provided a mobile management node used in a mobile communication system including first radio access network and second radio access network. The mobile management node includes: a reception unit configured to receive notification indicating detection of congestion from a radio base station in the first radio access network; an acquisition unit configured to acquire, from a policy and charging rule server apparatus, charging system information regarding a mobile station using a bearer set in a serving gateway apparatus and communication service class information in a flow unit inside the bearer when the notification is received and congestion does not occur on a side of the second radio access network; and a transmission unit configured to instruct the serving gateway apparatus to perform handover of a specific flow inside the bearer or the mobile station to the second radio access network based on the charging system information and the communication service class information.

DESCRIPTION OF EMBODIMENTS

Mobile Communication System According to First Embodiment of the Invention

A mobile communication system according to a first embodiment of the present invention will be described with reference to FIGS. 1 to 5.

Figure 1:
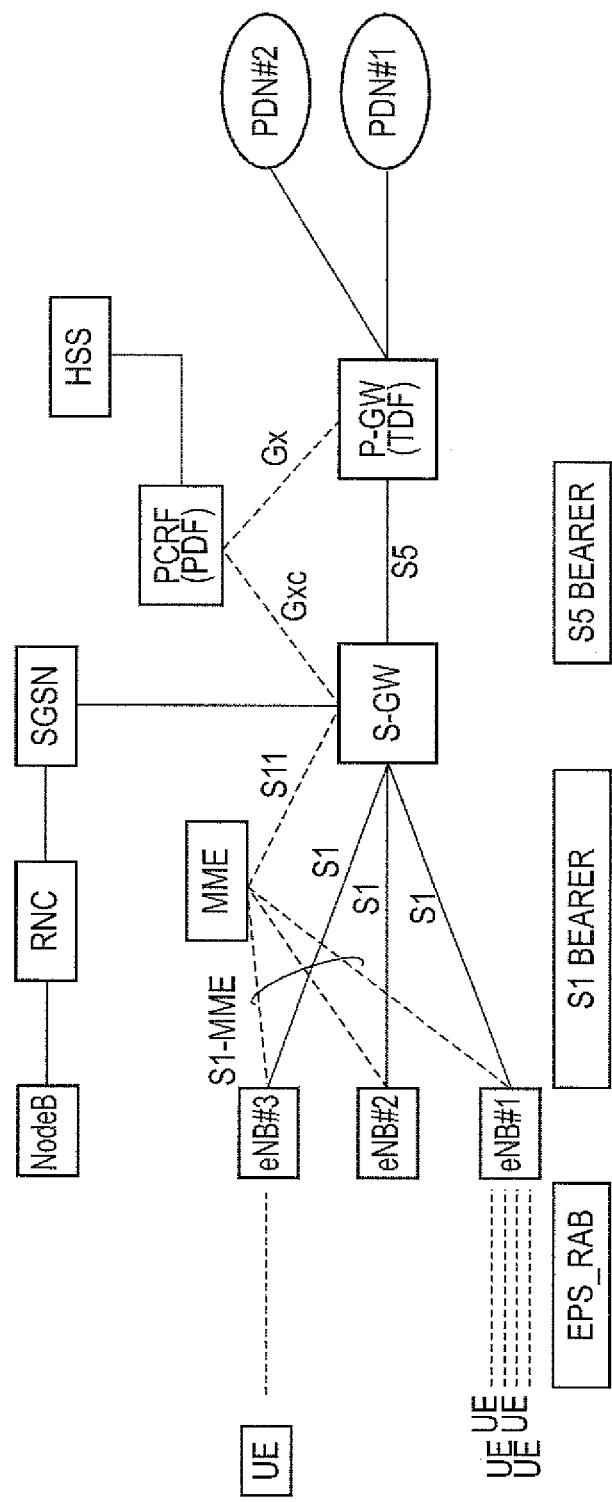
FIG. 1 is a diagram illustrating the overall configuration of a mobile communication system according to a first embodiment of the present invention.

As illustrated in FIG. 1, the mobile communication system according to the present embodiment includes a Policy and Charging Rules Function or a policy and charging rule server apparatus (PCRF), an Mobility management Entity or a mobile management node (MME), a PDN-Gateway (P-GW), an Serving-Gateway (S-GW), an Home Subscriber Server or a subscriber information management server apparatus (HSS), and an Serving GPRS Support Node or a packet switching apparatus (SGSN).

The mobile communication system according to the present embodiment includes a UTRAN/GERAN including an Radio Network Controller (RNC) and a NodeB (radio base station) and an E-UTRAN including eNB#1 to eNB#3.

Here, the P-GW and the S-GW can be connected via an S5 interface, the S-GW and the eNB#1 to eNB#3 can be connected via S1 interfaces, the MME and the eNB#1 to eNB#3 can be connected via S1-MME interfaces, the MME and the S-GW can be connected via an S11 interface, and the PCRF and the P-GW can be connected via a Gx interface.

When a Proxy Mobile IP (PMIP) is applied in the S5 interface, the PCRF and the S-GW can be connected via a Gxc interface.

That is, an Evolved Packet System-Radio Access Bearer (EPS-RAB) or a radio access bearer can be set between the eNB#1 to the eNB#3 and the UEs, an S1 bearer corresponding to the EPS-RAB can be set between the eNB#1 to the eNB#3 and the S-GW, and an S5 bearer corresponding to the EPS-RAB/the S1 bearer can be set between the S-GW and the P-GW.

The P-GW can be connected to Packet Data Networks (PDNs) #1 and #2.

The P-GW has a Traffic Detection Function (TDF) capable of performing Deep Packet Inspection (DPI) in which a communication service class in a flow unit inside each bearer (S1 bearer/S5 bearer or the like) can be determined.

Figure 2:
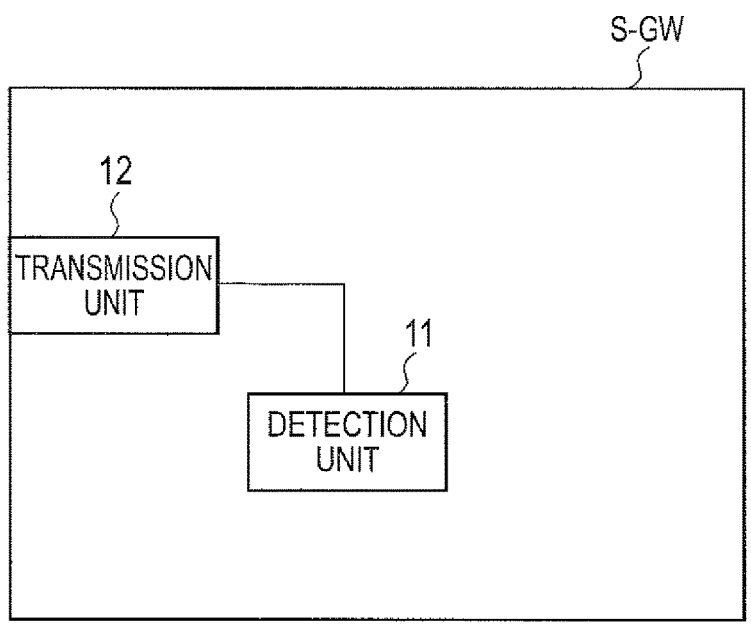
FIG. 2 is a functional block diagram illustrating an S-GW according to the first embodiment of the present invention.

As illustrated in FIG. 2, the S-GW includes a detection unit 11 and a transmission unit 12.

The detection unit 11 is configured to detect congestion in the S-GW, specifically, congestion on the E-UTRAN side and congestion of the UTRAN/GERAN side.

For example, the detection unit 11 is configured to detect the congestion in the S-GW when the number of call requests processed in the S-GW exceeds an upper limit of the number of call requests receivable in the S-GW.

The transmission unit 12 is configured to notify the PCRF that the detection unit 11 detects congestion in the S-GW, when the detection unit 11 detects the congestion.

Figure 3:
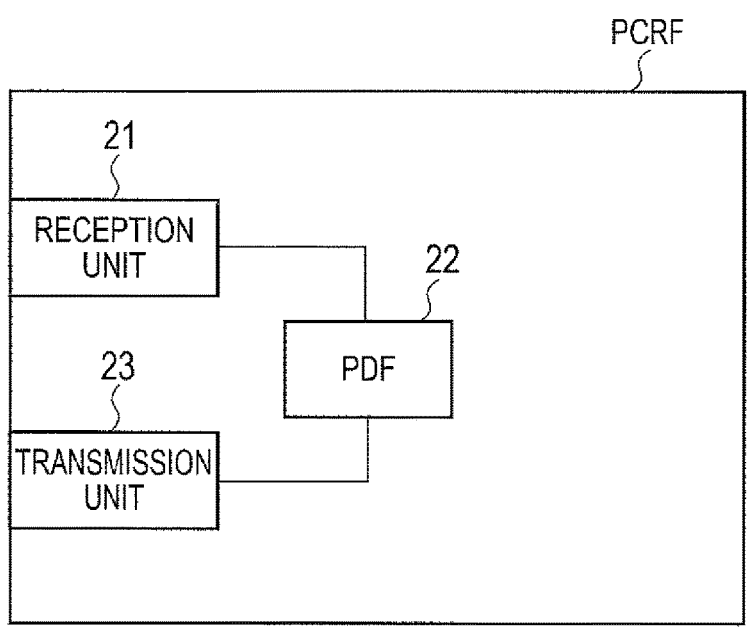
FIG. 3 is a functional block diagram illustrating a PCRF according to the first embodiment of the present invention.

As illustrated in FIG. 3, the PCRF includes a reception unit 21, a Policy Decision Function (PDF) 22, and a transmission unit 23.

The reception unit 21 is configured to receive notification indicating that the congestion is detected, from the S-GW.

The PDF 22 is configured to determine a control policy caused due to the congestion in each bearer (or each flow of each bearer).

Specifically, when the PDF 22 receives the notification indicating that the congestion is detected in the S-GW, the PDF 22 is configured to acquire charging system information regarding the UEs using the S1 bearer and the S5 bearer set in the S-GW from the HSS.

For example, the charging system information is information indicating a charging system (for example, a fixed charge, a charge for a premium service, or the like) applied to the corresponding UE.

When the PDF 22 receives the notification indicating that the congestion is detected in the S-GW, the PDF 22 is configured to acquire communication service class information in the flow unit inside the S1 bearer and the S5 bearer from the P-GW.

For example, the communication service class information is information indicating a class of the communication service (for example, a large amount of video download service or the like) provided by each flow.

The PDF 22 is configured to determine a bandwidth adjustment method of a specific flow inside the S1 bearer and the S5 bearer based on the charging system information and the communication service class information.

For example, when the PDF 22 receives the notification indicating that the congestion is detected in the S-GW, the PDF 22 may be configured not to change the bandwidth of a flow which is used by a user to which the premium service is applied or the bandwidth of a flow in which a voice communication service is provided and may be configured to decrease the bandwidth of a flow which is used by a user to which a fixed charge is applied and the bandwidth of a flow in which a large amount of video download service is provided.

Based on the bandwidth adjustment method determined by the PDF 22, the transmission unit 23 gives an instruction to perform bandwidth adjustment on specific flows inside the S1 bearer and the S5 bearer to the P-GW and the S-GW.

Hereinafter, an example of an operation of the mobile communication system according to the present embodiment will be described with reference to FIGS. 4 and 5.

First, an operation in which the PMIP is applied to the S5 interface will be described with reference to FIG. 4.

Figure 4:
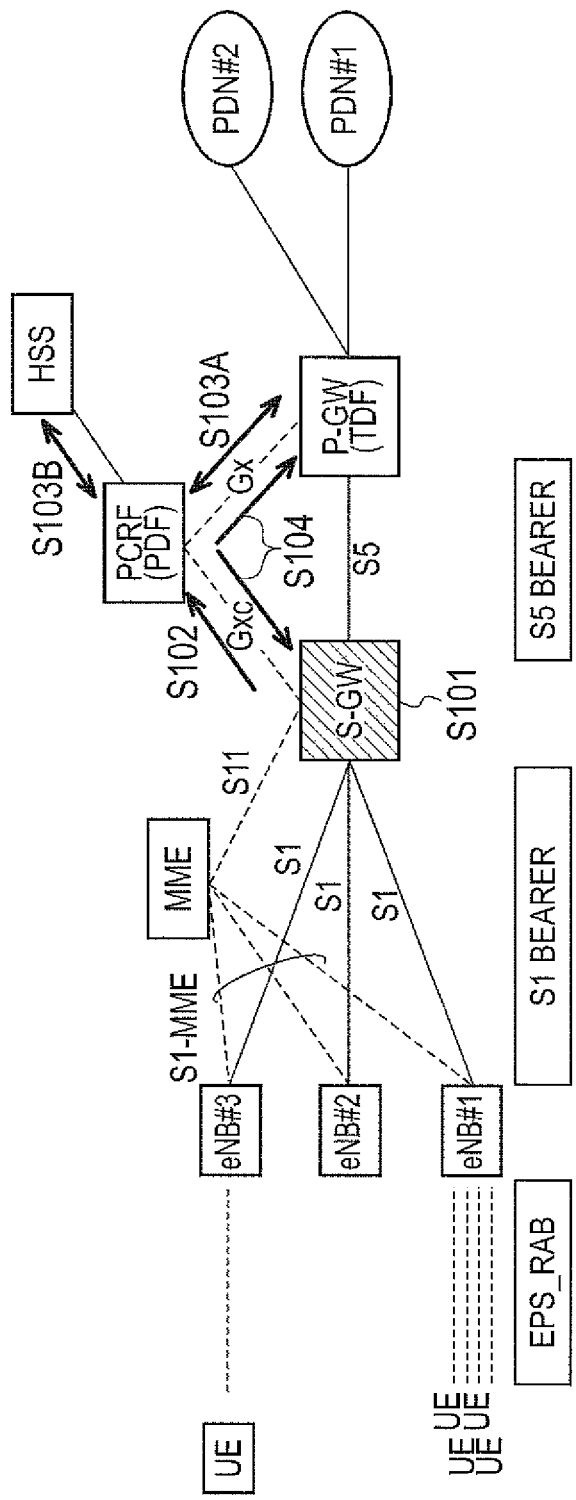
FIG. 4 is a diagram for describing an operation of a mobile communication system according to the first embodiment of the present invention.

As illustrated in FIG. 4, when the S-GW detects congestion on the E-UTRAN side in step S101, the S-GW notifies the PCRF of the detection of the congestion via the Gxc interface in step S102.

Based on the notification, the PDF in the PCRF requests the P-GW to transmit the communication service class information in the flow unit inside the S1 bearer and the S5 bearer set in the S-GW via the Gx interface in step S103A and requests the HSS to transmit the charging system information regarding the UEs using the S1 bearer and the S5 bearer in step S1033.

In step S103A, the TDF in the P-GW determines a communication service class in the flow unit inside the above-described S1 bearer and S5 bearer by performing the DPI, and notifies the PDF in the PCRF of the determination result as the communication service class information via the Gx interface.

In step S1033, the HSS acquires the charging system information regarding the UEs using the above-described S1 bearer and S5 bearer by searching a subscriber information database and notifies the PDF in the PCRF of the charging system information.

In step S104, based on the charging system information and the communication service class information, the PDF in the PCRF determines the bandwidth adjustment method in the specific flows inside the S1 bearer and the S5 bearer and transmits, to the P-GW and the S-GW, "Bearer Modification" indicating an instruction to adjust the bandwidths in the specific flows inside the above-described S1 bearer and S5 bearer via the Gx interface and the Gxc interface.

Here, instead of "Bearer Modification," "Update Bearer" defined in TS23.401 of 3GPP may be used or other messages may be used.

Thereafter, the S-GW and the P-GW adjust (decrease) the bandwidths of the specific flows inside the S1 bearer and the S5 bearer according to "Bearer Modification."

Second, an operation in the case in which GPRS Tunneling Protocol (GTP) is applied to the S5 interface will be described with reference to FIG. 5.

Figure 5:
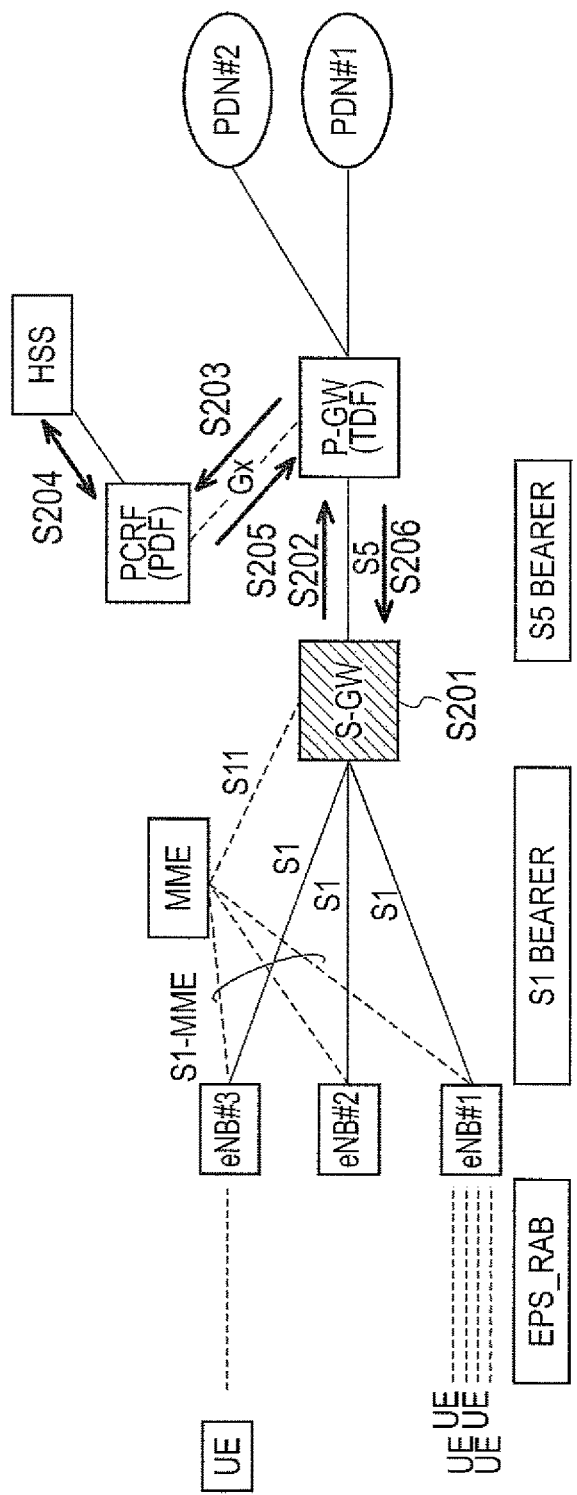
FIG. 5 is a diagram for describing an operation of the mobile communication system according to the first embodiment of the present invention.

As illustrated in FIG. 5, when the S-GW detects congestion on the E-UTRAN side in step S201, the S-GW notifies the P-GW of the detection of the congestion via the S5 interface in step S202.

In step S203, the TDF of the P-GW determines a communication service class in the flow unit inside the S1 bearer and the S5 bearer set in the S-GW by performing the DPI according to the notification and notifies the PDF in the PCRF of the determination result as the communication service class information via the Gx interface in addition to the above-described notification.

In step S204, the PDF in the PCRF acquires the charging system information regarding the UEs using the S1 bearer and the S5 bearer from the HSS.

In step S205, based on the charging system information and the communication service class information, the PDF in the PCRF determines the bandwidth adjustment method in the specific flows inside the S1 bearer and the S5 bearer and transmits, to the P-GW, "Bearer Modification" indicating an instruction to adjust the bandwidths in the specific flows inside the above-described S1 bearer and S5 bearer via the Gx interface.

In step S206, the P-GW adjusts (decreases) the bandwidths of the specific flows inside the S1 bearer and the S5 bearer according to "Bearer Modification" and transmits, to the S-GW, "Bearer Modification" indicating an instruction to adjust the bandwidths in the specific flows inside the above-described S1 bearer and S5 bearer via the S5 interface.

Thereafter, the S-GW adjusts (decreases) the bandwidths of the specific flows inside the S1 bearer and the S5 bearer according to "Bearer Modification."

In the mobile communication system according to the present embodiment, when the S-GW detects congestion, the S-GW can notify the PCRF of the detection of the congestion and the PDF in the PCRF can determine the bandwidth adjustment method of the specific flows inside the S1 bearer and the S5 bearer in cooperation with the TDF in the P-GW. Thus, communications can be allowed to continue as many as possible.

First Modification Example

Hereinafter, a mobile communication system according to a first modification example of the present invention will be described focusing on differences from the mobile communication system according to the above-described first embodiment with reference to FIGS. 6 to 8.

Figure 6:
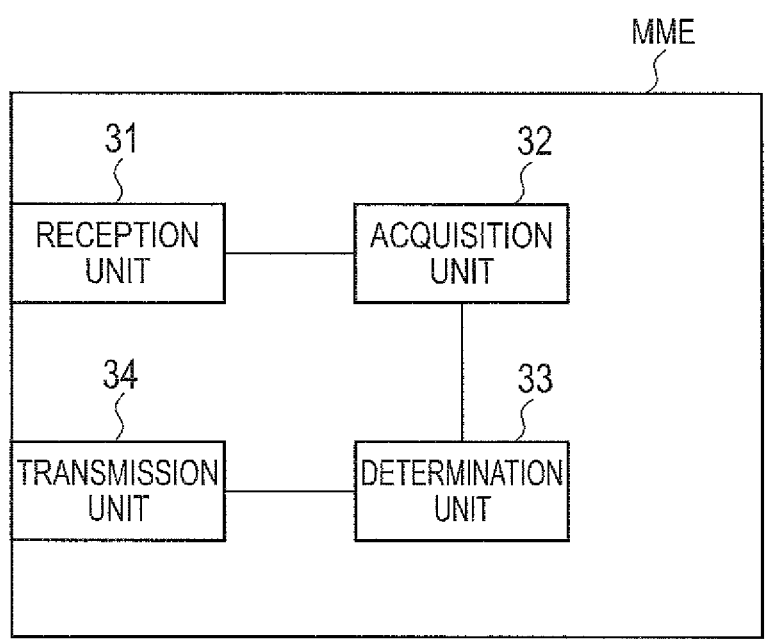
FIG. 6 is a functional block diagram illustrating a PCRF according to a first modification example of the present invention.

As illustrated in FIG. 6, an MME according to the first modification example includes a reception unit 31, an acquisition unit 32, a determination unit 33, and a transmission unit 24.

The reception unit 31 is configured to receive notification indicating detection of congestion from an eNB.

The acquisition unit 32 is configured to acquire, from the PDF in the PCRF, charging system information regarding the UE using the S1 bearer set in the eNB and communication service class information in the flow unit inside the S1 bearer when notification indicating detection of congestion in the eNB is received by the reception unit 31 and congestion does not occur on the UTRAN/GERAN side.

The determination unit 33 is configured to determine whether or not handover of a specific flow inside the S1 bearer is performed based on the charging system information and the communication service class information acquired by the acquisition unit 32.

The transmission unit 34 is configured to instruct the S-GW to perform handover of the specific flow inside the S1 bearer based on the determination result by the determination unit 33.

Hereinafter, an example of an operation of the mobile communication system according to the first modification example will be described with reference to FIGS. 7 and 8.

First, an operation in the case in which the PMIP is applied in an S5 interface will be described with reference to FIG. 7.

Figure 7:
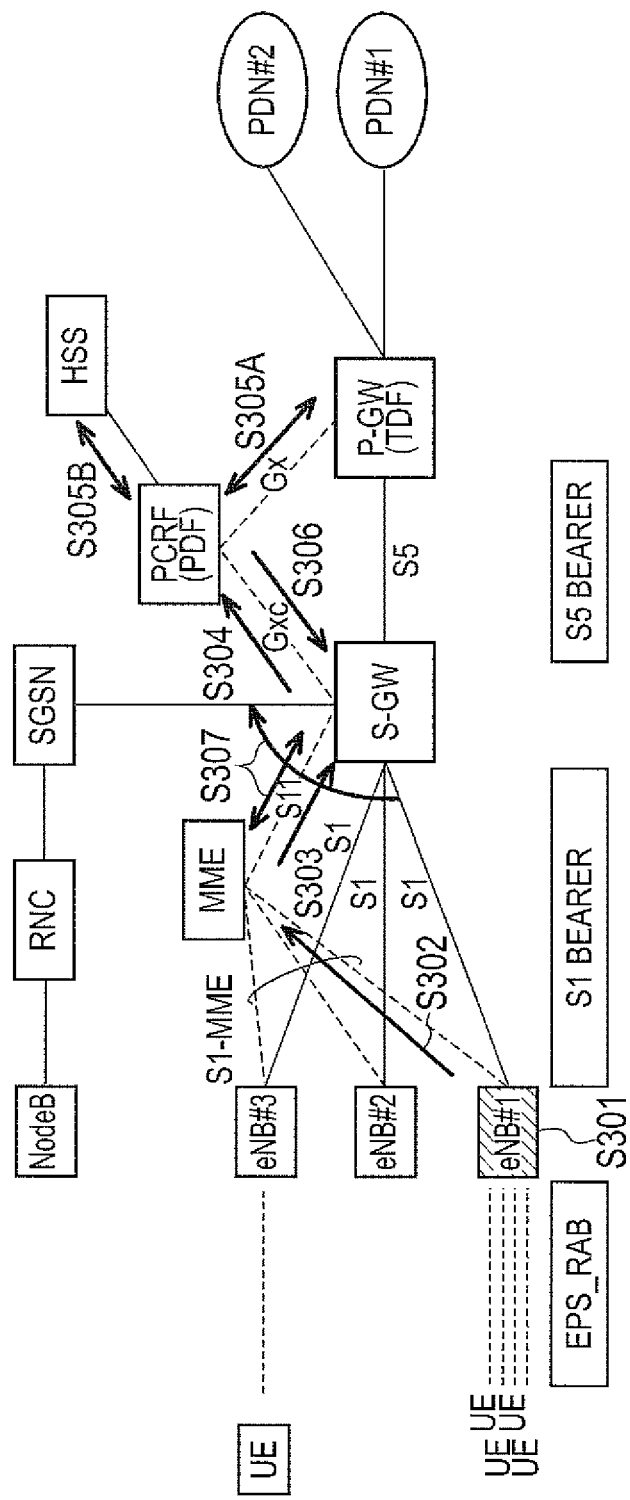
FIG. 7 is a diagram for describing an operation of a mobile communication system according to the first modification example of the present invention.

As illustrated in FIG. 7, when the eNB #1 detects congestion in the eNB by detecting buffer overflow in step S301, the eNB #1 notifies the MME of the detection of the congestion via the S1-MME interface in step S302.

In step S303, when the MME receives the notification and determines that congestion does not occur in the UTRAN/GERAN side, the MME transmits, to the S-GW via the S11 interface, a request signal making a request for the charging system information regarding the UE using the S1 bearer set in the eNB and the communication service class information in the flow unit inside the S1 bearer.

In step S304, the S-GW transmits the request signal to the PCRF via the Gxc interface.

The PDF in the PCRF acquires the communication service class information in the flow unit inside the S 1 bearer from the TDF in the P-GW via the Gx interface in step S305A, and acquires the charging system information regarding the UE using the S1 bearer from the HSS in step S305B.

The PDF in the PCRF notifies the S-GW of the charging system information and the communication service class information via the Gxc interface in step S306, and the S-GW notifies the MME of the charging system information and the communication service class information via the S11 interface in step S307.

As a result, when the MME determines that handover of the specific flow inside the S1 bearer or the mobile station UE (all of the flows of the mobile stations UE) is performed based on the acquired charging system information and communication service class information, the MME instructs the S-GW to perform the handover of the specific flow inside the S1 bearer or the mobile stations UE (all of the flows of the mobile stations UE) to the UTRAN/GERAN.

According to the instruction, the S-GW switches the specific flow inside the S1 bearer or the mobile stations UE (all of the flows of the mobile stations UE) from the E-UTRAN to the UTRAN/GERAN.

Second, an operation in the case in which GTP is applied in the S5 interface will be described with reference to FIG. 8.

Figure 8:
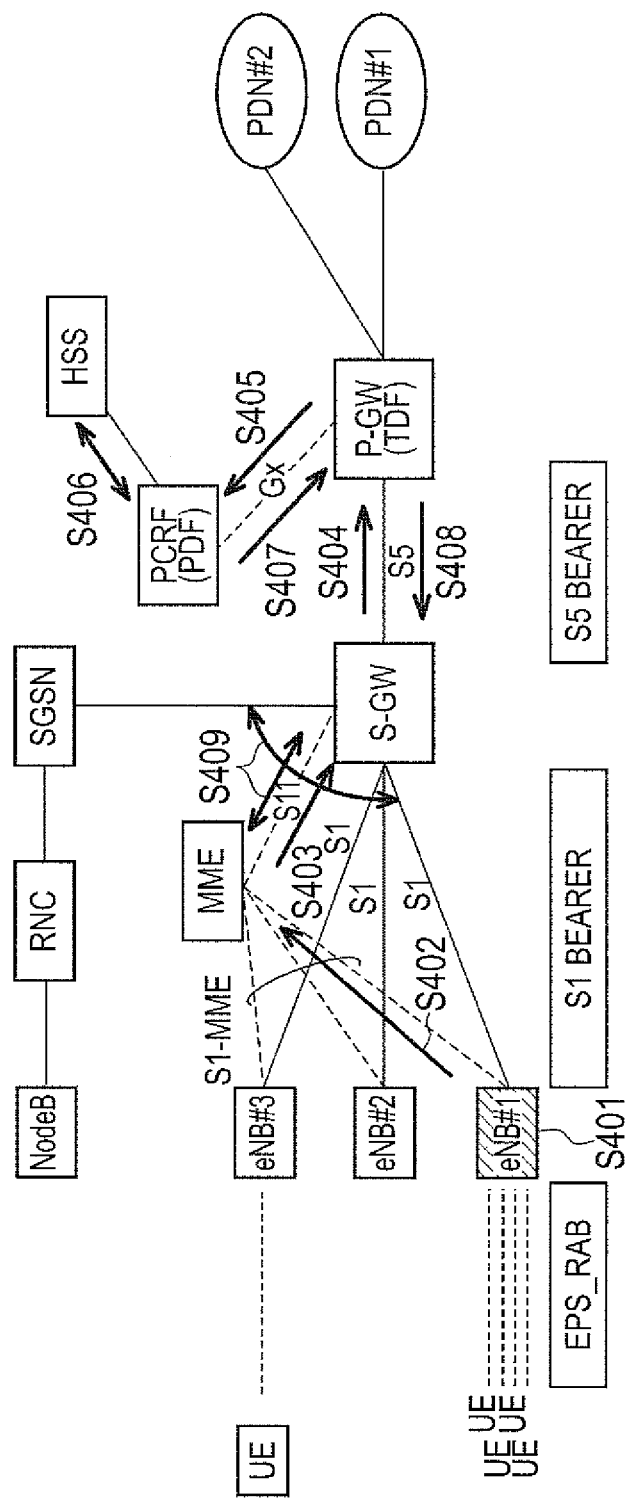
FIG. 8 is a diagram for describing an operation of the mobile communication system according to the first modification example of the present invention.

As illustrated in FIG. 8, when the eNB #1 detects congestion in the eNB by detecting buffer overflow in step S401, the eNB #1 notifies the MME of the detection of the congestion via the S1-MME interface in step S402.

In step S403, when the MME receives the notification and determines that congestion does not occur on the UTRAN/GERAN side, the MME transmits, to the S-GW via the S11 interface, a request signal making a request for the charging system information regarding the UE using the S1 bearer set in the eNB and the communication service class information in the flow unit inside the S1 bearer.

In step S404, the S-GW transmits the request signal to the P-GW via the S5 interface.

In step S405, the TDF in the P-GW determines the communication service class in the flow unit inside the S1 bearer set in the eNB by performing the DPI according to the request signal and notifies the PDF in the PCRF of the determination result in addition to the above-described request signal as the communication service class information via the Gx interface.

In step S406, the PDF in the PCRF acquires the charging system information regarding the UE using the S1 bearer from the HSS.

The PDF in the PCRF notifies the P-GW of the charging system information and the communication service class information via the Gx interface in step S407, the SPGW notifies the S-GW of the charging system information and the communication service class information via the S5 interface in step S408, and the S-GW notifies the MME of the charging system information and the communication service class information via the S11 interface in step S409.

As a result, when the MME determines that handover of the specific flow inside the S1 bearer or the mobile stations UE (all of the flows of the mobile stations UE) is performed based on the acquired charging system information and communication service class information, the MME instructs the S-GW to perform the handover of the specific flow inside the S1 bearer or the mobile stations UE (all of the flows of the mobile stations UE) to the UTRAN/GERAN.

According to the instruction, the S-GW switches the specific flow inside the S1 bearer or the mobile stations UE (all of the flows of the mobile stations UE) from the E-UTRAN to the UTRAN/GERAN.

In the mobile communication system according to the first modification example, the MME can determine whether the handover of the specific flow or the mobile stations UE (all of the flows of the mobile stations UE) to the UTRAN/GERAN is performed in consideration of the congestion status of the UTRAN/GERAN when the MME detects that the congestion occurs in the eNB.

Second Modification Example

Next, a mobile communication system according to a second modification example of the present invention will be described focusing on differences from the mobile communication system according to the above-described first embodiment with reference to FIGS. 9 and 10.

Hereinafter, an example of an operation of the mobile communication system according to the second modification example will be described with reference to FIGS. 9 and 10.

First, an operation in the case in which the PMIP is applied in an S5 interface will be described with reference to FIG. 9.

Figure 9:
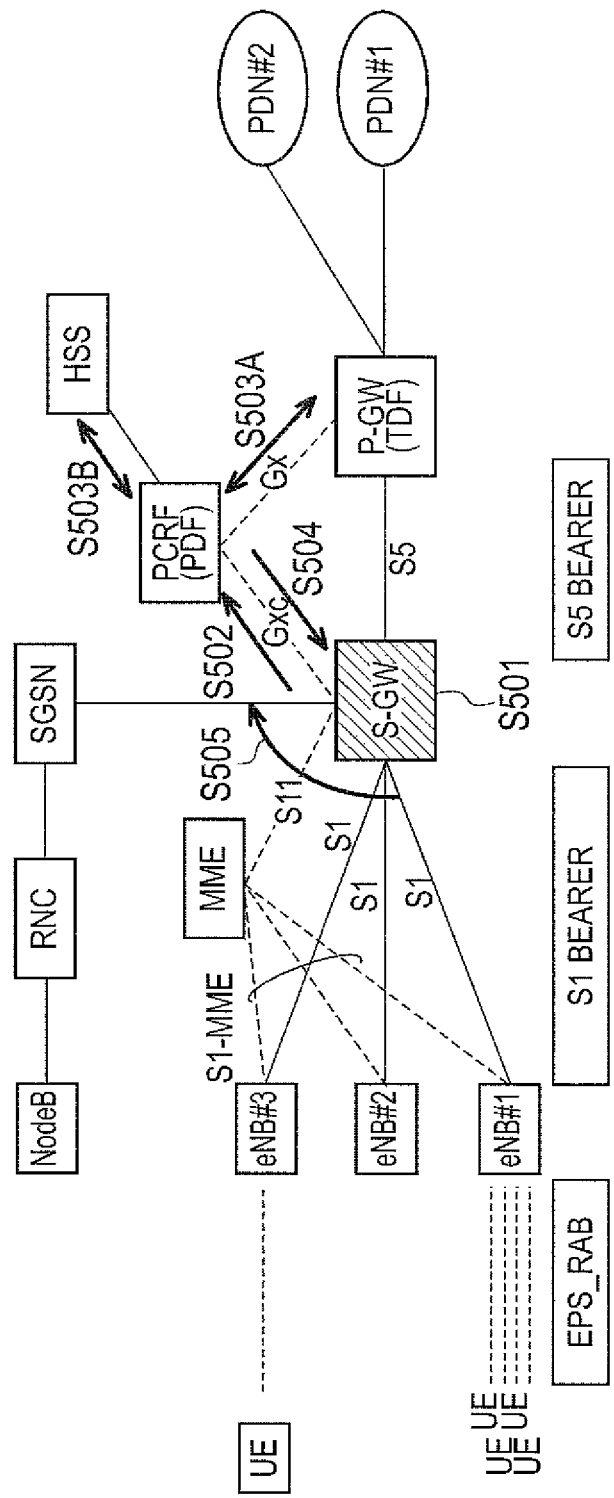
FIG. 9 is a diagram for describing an operation of a mobile communication system according to a second modification example of the present invention.

As illustrated in FIG. 9, when the S-GW detects congestion on the E-UTRAN side in step S501, the S-GW notifies the PDF in the PCRF of the detection of the congestion via the Gxc interface in step S502.

When the PDF in the PCRF receives the notification and determines that congestion does not occur on the UTRAN/GERAN side, the PDF acquires the communication service class information in the flow unit inside the S1 bearer from the TDF in the P-GW via the Gx interface in step S503A, and acquires the charging system information regarding the UE using the S1 bearer from the HSS in step S503B.

Here, when the PDF in the PCRF determines that handover of the specific flow inside the S1 bearer or the mobile stations UE (all of the flows of the mobile stations UE) is performed based on the acquired charging system information and the communication service class information, the PDF instructs the S-GW to perform the handover of the specific flow inside the S1 bearer or the mobile stations UE (all of the flows of the mobile stations UE) to the UTRAN/GERAN via the Gxc interface in step S504.

According to the instruction, the S-GW switches the specific flow inside the S1 bearer or the mobile stations UE (all of the flows of the mobile stations UE) from the E-UTRAN to the UTRAN/GERAN.

Second, an operation in the case in which GTP is applied in the S5 interface will be described with reference to FIG. 10.

Figure 10:
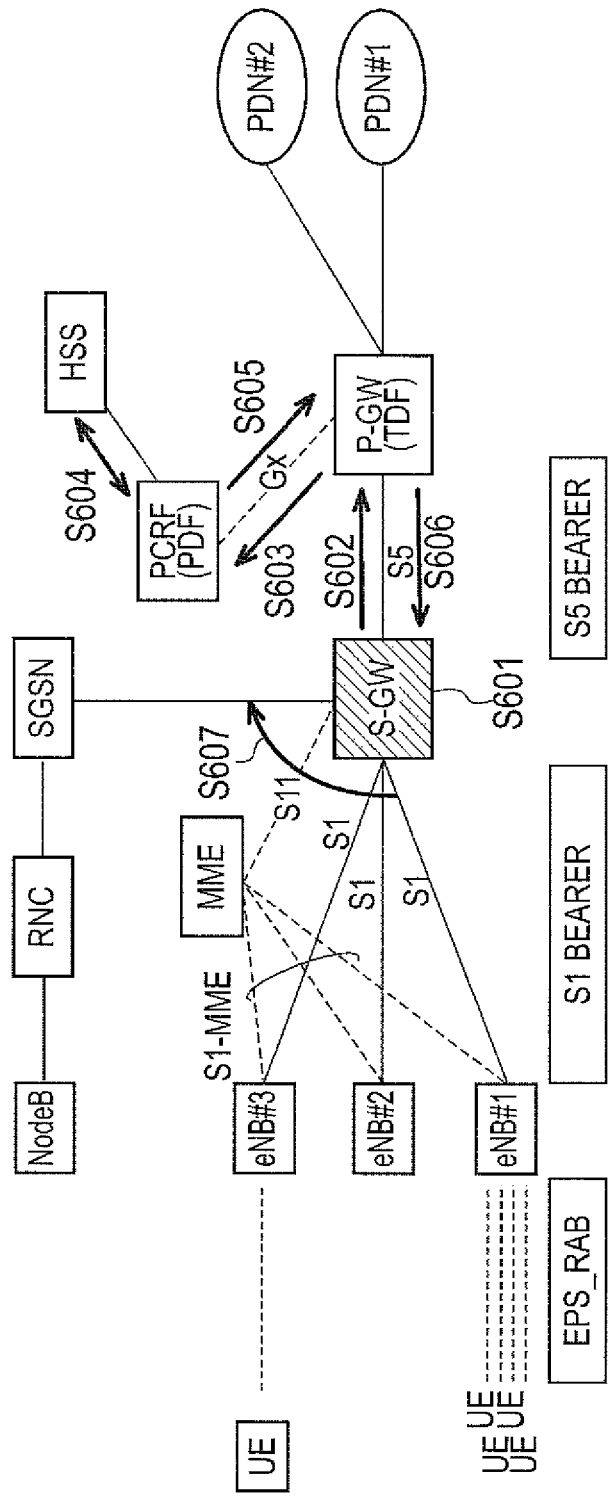
FIG. 10 is a diagram for describing an operation of the mobile communication system according to the second modification example of the present invention.

As illustrated in FIG. 10, when the S-GW detects congestion on the E-UTRAN side in step S601, the S-GW notifies the P-GW of the detection of the congestion via the S5 interface in step S602.

In step S603, the TDF in the P-GW determines the communication service class of the flow unit inside the S1 bearer set in the S-GW by performing the DPI according to the notification, and notifies the PDF in the PCRF of the determination result as the communication service class information via the Gx interface in addition to the above-described notification.

When the PDF in the PCRF receives the notification and determines that congestion does not occur on the UTRAN/GERAN side, the PDF acquires the charging system information regarding the UE using the S1 bearer from the HSS in step S604.

When the PDF in the PCRF determines that handover of the specific flow inside the S1 bearer or the mobile stations UE (all of the flows of the mobile stations UE) is performed based on the acquired charging system information and the communication service class information, the PDF transmits, to the P-GW, a handover instruction signal instructing to perform the handover of the specific flow inside the S1 bearer or the mobile stations UE (all of the flows of the mobile stations UN) to the UTRAN/GERAN via the Gx interface in step S605.

In step S606, the P-GW transmits the handover instruction signal to the S-GW via the S5 interface.

According to the instruction, the S-GW switches the specific flow inside the S1 bearer or the mobile stations UE (all of the flows of the mobile stations UE) from the E-UTRAN to the UTRAN/GERAN.

In the mobile communication system according to the second modification example, the PDF in the PCRF can determine whether the handover of the specific flow or the mobile stations UE (all of the flows of the mobile stations UE) to the UTRAN/GERAN is performed in consideration of the congestion status of the UTRAN/GERAN when the PDF detects that the congestion occurs in the S-GW.

The characteristics of the present embodiment described above may be expressed as follows.

According to a first characteristic of the present embodiment, a mobile communication method includes: notifying, by the serving gateway apparatus (S-GW), the policy and charging rule server apparatus (PCRF), specifically, the PDF in the PCRF of detection of congestion when the congestion is detected; acquiring, by the PDF in the PCRF, the charging system information regarding the UEs (mobile station) using the S1 bearer and the S5 bearer (bearer) set in the S-GW from the (subscriber information management server apparatus (HSS) according to the notification; acquiring, by the PDF in the PCRF, the communication service class information in the flow unit inside the S1 bearer and the S5 bearer from the packet data network gateway apparatus (P-GW) according to the notification; and performing, by the PDF in the PCRF, bandwidth adjustment in specific flows inside the S1 bearer and the S5 bearer based on the charging system information and the communication service class information of the flow unit.

According to a second characteristic of the present embodiment, the PCRF includes: the reception unit 21 configured to receive notification indicating detection of congestion from the S-GW; and the PDF (control unit) 22 configured to perform bandwidth adjustment in the specific flow inside the S1 bearer and the S5 bearer according to the notification based on the charging system information which is acquired from the HSS and regarding the UEs using the S1 bearer and the S5 bearer set in the S-GW, and the communication service class information in the flow unit inside the S1 bearer and the S5 bearer which are acquired from the P-GW.

According to a third characteristic of the present embodiment, a mobile communication method includes: notifying, by the S-GW connected to the E-UTRAN (first radio access network) and the UTRAN/GERAN (second radio access network), the PDF in the PCRF of detection of congestion, when the S-GW detects the congestion on the E-UTRAN side; acquiring, by the PDF in the PCRF, the charging system information regarding the UE using the S1 bearer set in the S-GW from the HSS and acquiring the communication service class information in the flow unit inside the S1 bearer from the P-GW, when the notification is received and the congestion does not occur on the UTRAN/GERAN side; and instructing, by the PDF in the PCRF, the S-GW to perform handover of the specific flow inside the S1 bearer or the mobile station UE to the UTRAN/GERAN based on the charging system information and the communication service class information of the flow unit.

According to a fourth characteristic of the present embodiment, the PCRF includes: the reception unit 21 configured to receive, from the S-GW connected to the E-UTRAN and the UTRAN/GERAN, notification indicating detection of congestion on the E-UTRAN side; and the PDF 22 configured to instruct the S-GW to perform handover of the specific flow inside the S1 bearer or the mobile station UE to the UTRAN/GERAN based on the charging system information, which is acquired from the HSS and regarding the mobile station UE using the S1 bearer set in the S-GW, and the communication service class information in the flow unit inside the S1 bearer which is acquired from the P-GW, when the notification is received and the congestion does not occur on a side of the UTRAN/GERAN.

According to a fifth characteristic of the present embodiment, a mobile communication method in the mobile communication system including the E-UTRAN and the UTRAN/GERAN includes: notifying, by the eNB (radio base station) in the E-UTRAN, the mobile management node (MME) of detection of congestion when the congestion is detected; acquiring, by the MME, the charging system information regarding the mobile station UE using the S1 bearer set in the eNB and the communication service class information in the flow unit inside the S1 bearer from the PDF in the PCRF when the notification is received and congestion does not occur on the UTRAN/GERAN side; and instructing, by the MME, the S-GW to perform handover of the specific flow inside the S1 bearer or the UE to the UTRAN/GERAN based on the charging system information and the communication service class information of the flow unit.

According to a sixth characteristic of the present embodiment, the MME used in the mobile communication system including the E-UTRAN and the UTRAN/GERAN includes: the reception unit 31 configured to receive notification indicating detection of congestion from the eNB in the E-UTRAN; the acquisition unit 32 configured to acquire, from the PDF in the PORE, the charging system information regarding the UE using the S1 bearer set in the eNB and the communication service class information in the flow unit inside the S1 bearer when the notification is received and congestion does not occur on the UTRAN/GERAN side; and the transmission unit 34 configured to instruct the S-GW to perform handover of the specific flow inside the S1 bearer or the mobile station UE to the UTRAN/GERAN based on the charging system information and the communication service class information.

The operations of the UE, the eNB, the MME, the S-GW, the P-GW, the PCRF, the SGSN, the RNC, the NodeB, and the MSS described above may be performed by hardware, may be performed by a software module executed by a processor, or may be performed by a combination of the hardware and the software module.

The software module may be installed in a storage medium of any format such as a Random Access Memory (RAM), a flash memory, a Read Only Memory (ROM), an Erasable Programmable ROM (EPROM), an Electronically Erasable and Programmable ROM (EEPROM), a register, a hard disk, a removable disc, or a CD-ROM.

The storage medium is connected to the processor so that the processor can read and write information from and on the storage medium. The storage medium may be integrated into the processor. The storage medium and the process may be installed in an ASIC. The ASIC may be installed in the UE, the eNB, the MME, the S-GW, the P-GW, the PCRF, the SGSN, the RNC, the NodeB, the HSS, or the like. The storage medium and the processor may be installed as a discrete component in the UE, the eNB, the MME, the S-GW, the P-GW, the PCRF, the SGSN, the RNC, the NodeB, the HSS, or the like.

The present invention has been described in detail using the above-described embodiments, but it should be apparent to those skilled in the art that the present invention is not limited to the embodiments described in the present specification. The present invention can be corrected and modified without departing from the gist and scope of the present invention determined in the claims of the present invention. Accordingly, the disclosure of the present specification is made to describe examples and does not have any limiting meaning to the present invention.

The entire content of Japanese Patent Application No. 2011-246553 (filed Nov. 10, 2011) is incorporated by reference.

INDUSTRIAL APPLICABILITY

As described above, when congestion in the S-GW is detected, the present invention can provide the mobile communication method, the policy and charging rule server apparatus, and the mobile management node capable of continuing communications as many as possible.

Specifically, the present invention can provide the mobile communication method, the policy and charging rule server apparatus, and the mobile management node capable of adjusting bandwidths of the specific flows in consideration of the policy and charging rules.

The present invention can also provide the mobile communication method, the policy and charging rule server apparatus, and the mobile management node capable of selecting a specific flow in consideration of the policy and charging rules and performing handover of communication or a mobile station to an available radio access side.

REFERENCE SIGNS LIST

UE . . . Mobile station
eNB, NodeB . . . Radio base station
MME . . . Mobile management node
S-GW . . . Serving gateway apparatus
P-GW . . . Packet data network gateway apparatus
PCRF . . . Policy and charging rule server apparatus
SGSN . . . Packet switching apparatus
RNC . . . Radio network controller
HSS . . . Subscriber information management server apparatus
11 . . . Detection unit
12, 23, 34 . . . Transmission unit
21, 31 . . . Reception unit
22 . . . PDF
32 . . . Acquisition unit
33 . . . Determination unit

The invention claimed is:

1. A policy and charging rule server apparatus comprising:
a reception circuit configured to receive notification indicating detection of congestion from a serving gateway apparatus; and
a control circuit configured to perform bandwidth adjustment in a specific flow inside a S1 bearer and a S5 bearer, wherein the bandwidth adjustment is based on:
charging system information which is acquired from a subscriber information management server apparatus and is information regarding a mobile station using the S1 bearer and the S5 bearer set in the serving gateway apparatus according to the notification, and
communication service class information in each flow inside the S1 bearer and the S5 bearer which is acquired from a packet data network gateway apparatus according to the notification,
wherein the S1 bearer is set between a radio base station and the serving gateway apparatus, and
wherein the S5 bearer is set between the serving gateway apparatus and the packet data network gateway apparatus.

* * * * *